United States Patent
Lee et al.

(10) Patent No.: US 8,344,653 B2
(45) Date of Patent: Jan. 1, 2013

(54) LIGHT EMITTING DIODE BACKLIGHT DRIVING SYSTEM

(75) Inventors: Yong-Long Lee, Jhongli (TW); Chin-Po Cheng, Jhongli (TW)

(73) Assignee: Ampower Technology Co., Ltd., Jhongli, Taoyuan County (TW)

( * ) Notice: Subject to any disclaimer, the term of this patent is extended or adjusted under 35 U.S.C. 154(b) by 214 days.

(21) Appl. No.: 12/826,600

(22) Filed: Jun. 29, 2010

(65) Prior Publication Data

US 2011/0260644 A1   Oct. 27, 2011

(30) Foreign Application Priority Data

Apr. 22, 2010   (CN) .................... 2010 2 0167179 U

(51) Int. Cl.
*H05B 37/02*   (2006.01)
(52) U.S. Cl. ......... 315/291; 315/225; 315/308; 315/312
(58) Field of Classification Search .... 315/169.1–169.4, 315/209 R, 291, 307, 308, 224, 225, 312; 345/48, 76–82, 204, 211–214
See application file for complete search history.

(56) References Cited

U.S. PATENT DOCUMENTS

| | | | | |
|---|---|---|---|---|
| 7,825,610 B2 * | 11/2010 | Zhao et al. | ..................... | 315/299 |
| 8,049,439 B2 * | 11/2011 | Zhao et al. | ..................... | 315/297 |
| 2006/0043911 A1 * | 3/2006 | Shao et al. | ..................... | 315/291 |

* cited by examiner

*Primary Examiner* — Jimmy Vu
(74) *Attorney, Agent, or Firm* — Altis Law Group, Inc.

(57) ABSTRACT

A light emitting diode (LED) backlight driving system drives at least one LED array, and includes a boost power stage circuit, a controller, a multi-channel constant current driving circuit, a voltage dividing circuit, and an offset voltage generating circuit. The boost power stage circuit boosts direct current (DC) power signals to output driving voltage to drive the LED array. The multi-channel constant current driving circuit controls current flowing through the LED array, and outputs regulating voltage to the controller to regulate the driving voltage. The voltage dividing circuit divides the driving voltage to generate feedback voltage to send to the controller. The offset voltage generating circuit generates offset voltage to modify the feedback voltage according to at least one mode selection signal. The controller controls the driving voltage according to the modified feedback voltage and the regulating voltage.

18 Claims, 4 Drawing Sheets

LIGHT EMITTING DIODE BACKLIGHT DRIVING SYSTEM

BACKGROUND

1. Technical Field

The disclosure relates to backlight driving systems, and particularly to a light emitting diode backlight driving system.

2. Description of Related Art

LEDs are arranged in parallel strings in liquid crystal displays (LCDs) driven by a direct current (DC) to DC converter and a multi-channel constant current driver. The multi-channel constant current driver outputs regulating voltage to regulate output voltage of the DC to DC converter to achieve high converting efficiency. However, several values of driving current need to be supplied to the LEDs to achieve different brightness levels. Thus, the regulating voltage of the multi-channel constant current driver varies greatly, which reduces converting efficiency.

DETAILED DESCRIPTION

Figure 1:
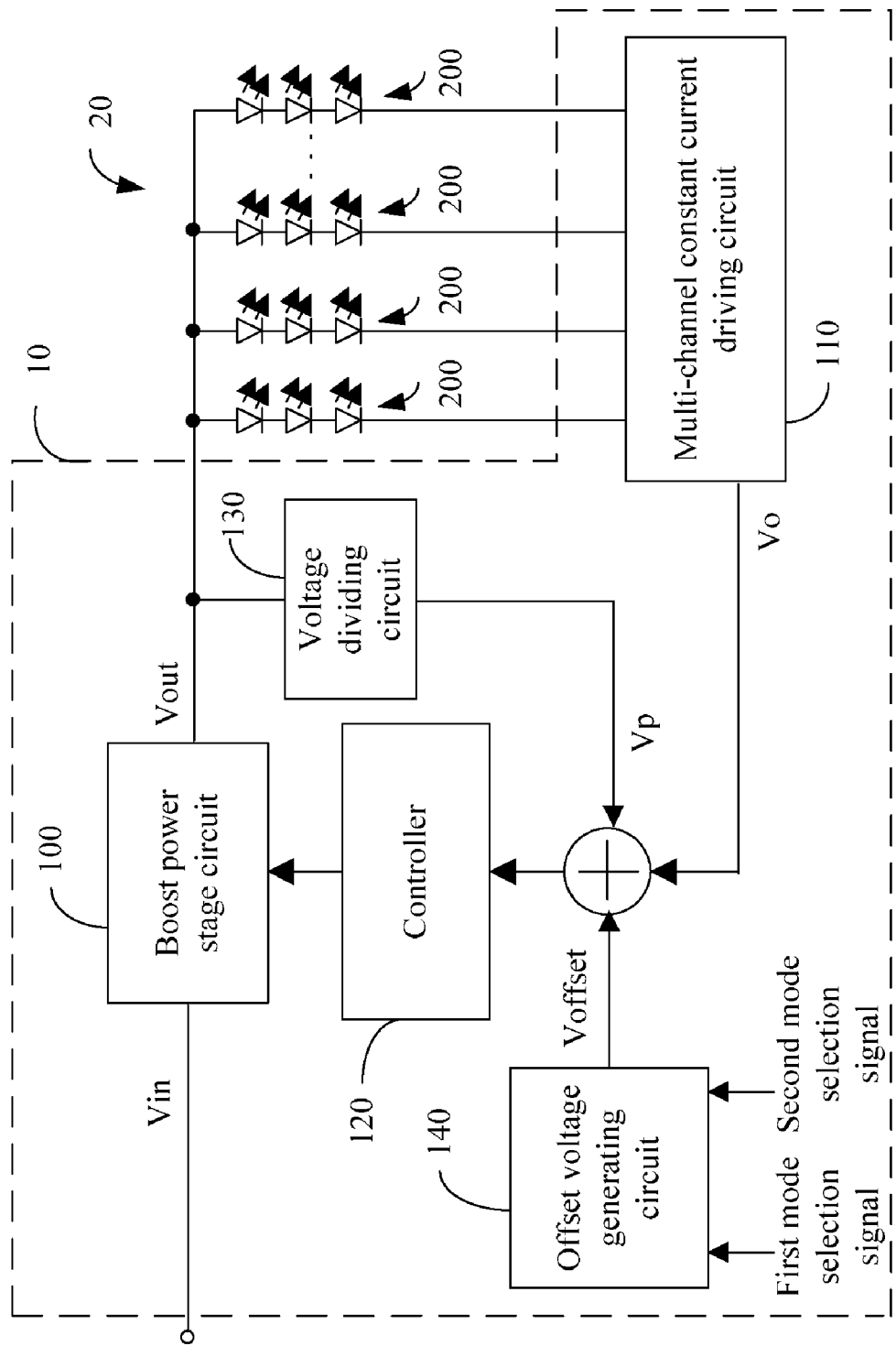
FIG. 1 is a schematic diagram of an embodiment of a light emitting diode (LED) backlight driving system as disclosed.

FIG. 1 is a schematic diagram of an embodiment of a light emitting diode (LED) backlight driving system 10 as disclosed. The LED backlight driving system 10 drives at least one LED array 20, and includes at least one boost power stage circuit 100, at least one multi-channel constant current driving circuit 110, at least one controller 120, at least one voltage dividing circuit 130, and an offset voltage generating circuit 140. In one embodiment, the LED array 20 includes a plurality of LED strings 200 connected in parallel, and each LED string 200 includes a plurality of LEDs connected in series. In one embodiment, there are equal numbers of the boost power stage circuits 100, the multi-channel constant current driving circuits 110, the controllers 120, the voltage dividing circuits 130, and the LED arrays 20. That is, each LED array 20 corresponds to one boost power stage circuit 100, one multi-channel constant current driving circuit 110, one controller 120, and one voltage dividing circuit 130.

The boost power stage circuit 100 boosts direct current (DC) power signals Vin, and outputs driving voltage Vout to drive the LED array 20. The controller 120 controls the boost power stage circuit 100. The multi-channel constant current driving circuit 110 controls current flowing through the LED array 20. The multi-channel constant current driving circuit 110 also outputs regulating voltage Vo to the controller 120 to regulate the driving voltage Vout output by the boost power stage circuit 100, to make the current flowing through the LED array 20 constant, which avoids variations in brightness.

The voltage dividing circuit 130 divides the driving voltage Vout to generate feedback voltage Vp to send to the controller 120. The offset voltage generating circuit 140 is connected to the voltage dividing circuit 130, generates offset voltage Voffset to modify the feedback voltage Vp according to at least one mode selection signal. In one embodiment, the controller 120 controls the driving voltage Vout output by the boost power stage circuit 100 according to the modified feedback voltage Vp and the regulating voltage Vo. The at least one mode selection signal is input by means of switches and/or buttons.

Driving current of the LED array 20 needs to operate at several values corresponding to different output brightness. For example, the driving current of the LED array 20 may be 30 mA, 60 mA, 90 mA, and 120 mA, and corresponding driving voltage Vout may be 27V, 30V, 33V, and 36V, respectively. If the driving current of the LED array 20 needs to be changed, for example, from 30 mA to 60 mA, the driving voltage Vout needs to be changed from 27V to 30V. The offset voltage generating circuit 140 generates suitable offset voltages Voffset to modify the feedback voltage Vp generated by the voltage dividing circuit 130 according to corresponding input mode selection signals, finally to modify a set point of the driving voltage Vout, such as, from 27V to 29V. In a non-limiting example, a regulating scope of the regulating voltage Vo of the multi-channel constant current driving circuit 110 is only 1V, lower than a regulating scope of 3V without the offset voltage generating circuit 140. Thus, the multi-channel constant current driving circuit 110 has higher regulating precision and lower operating temperatures, and regulates the driving voltage Vout to the best value to achieve the best converting efficiency. In one embodiment, if the number of the mode selection signals is N and the number of the driving current is M, where $M=2^N$.

Figure 2:
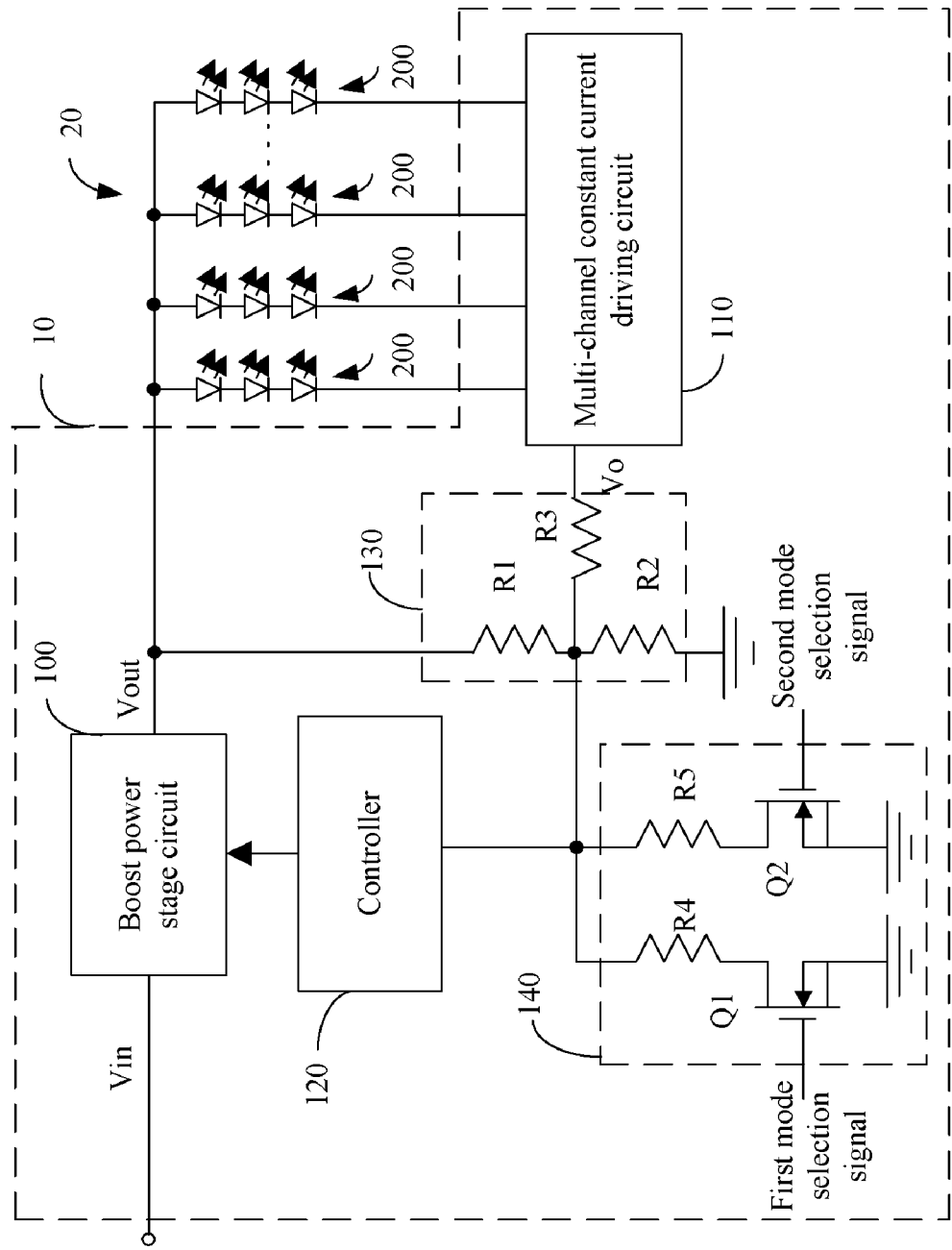
FIGS. 2 to 4 are circuit diagrams of three different embodiment of LED backlight driving system as disclosed.
Figure 3:
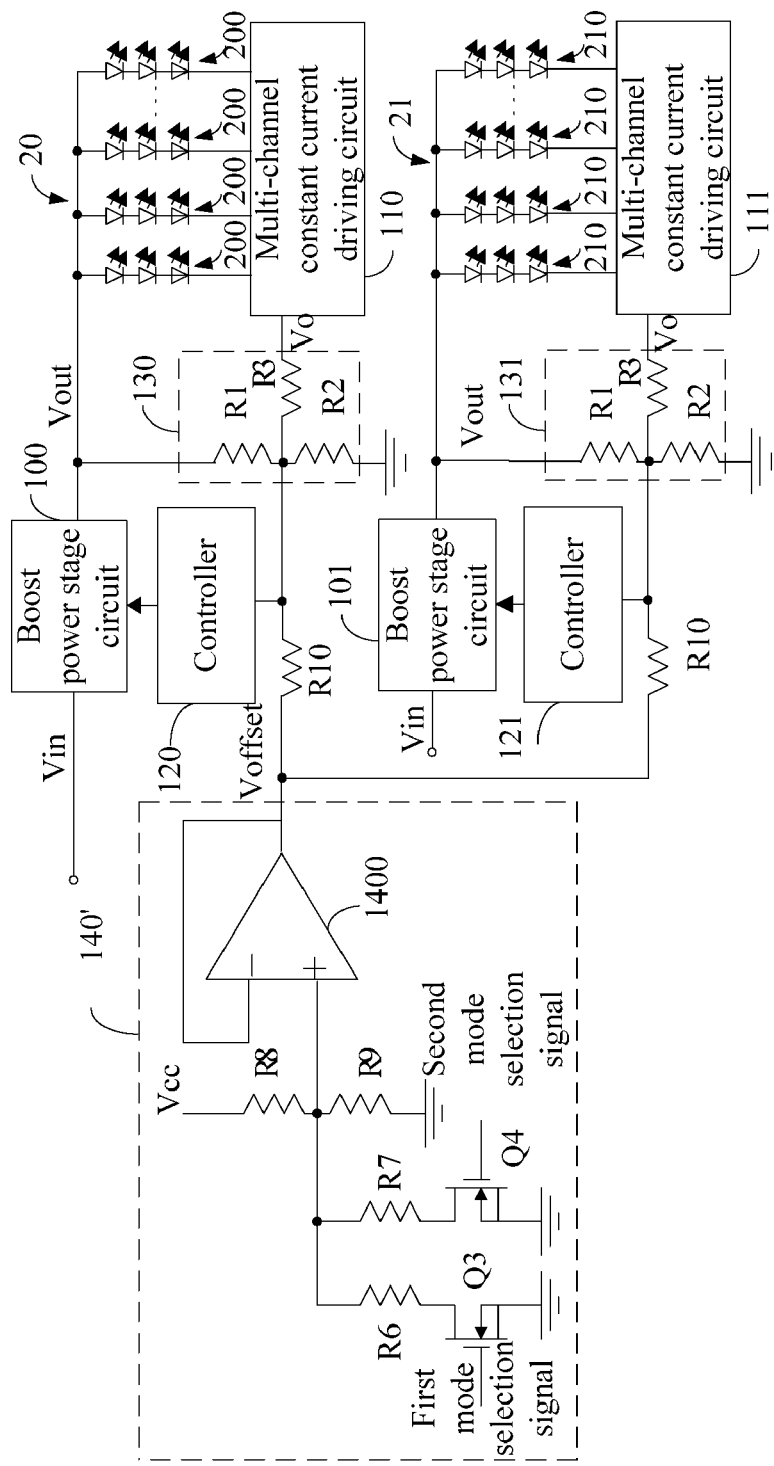
Figure 4:
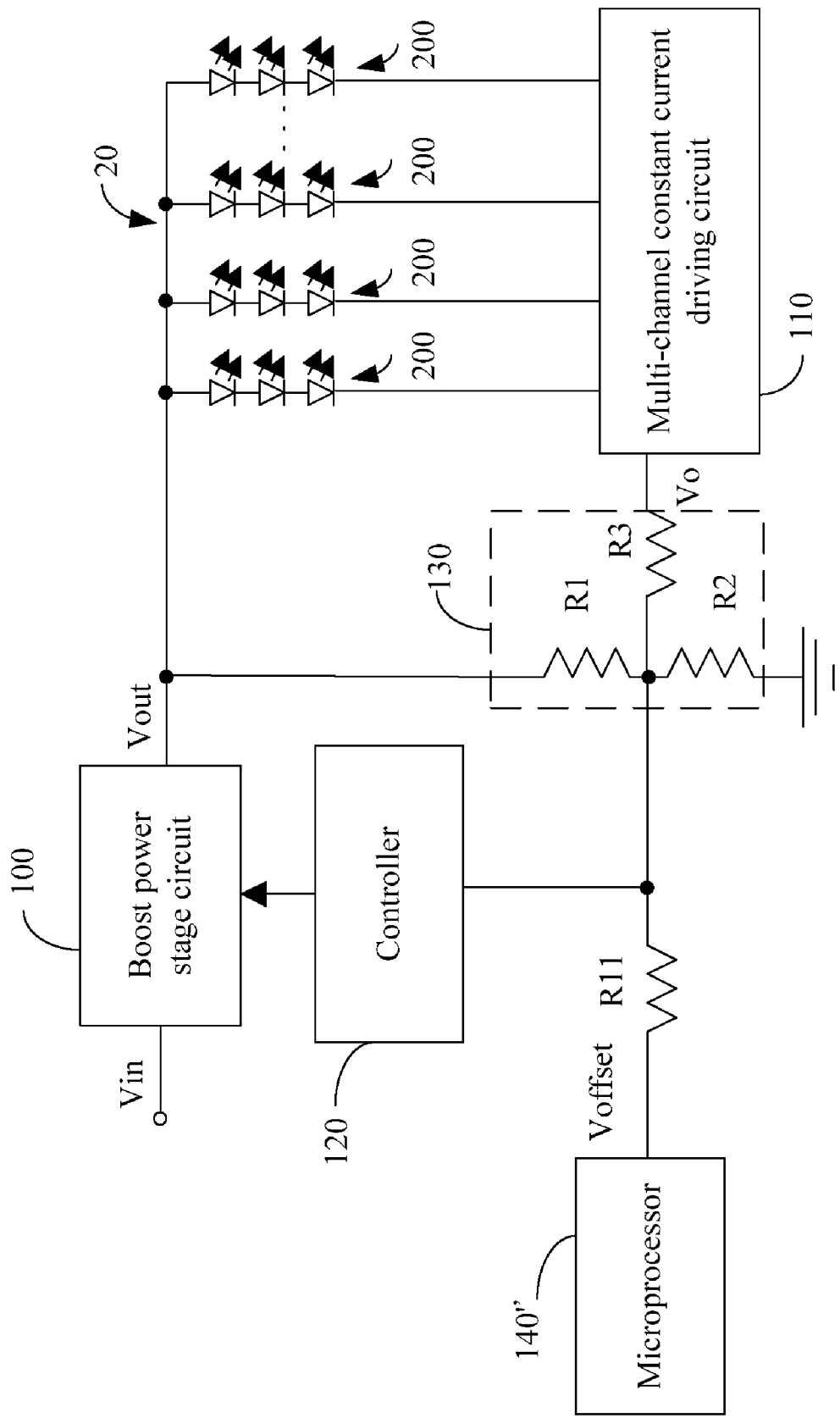

As shown in FIGS. 2 to 4, the voltage dividing circuit 130 includes a first resistor R1, a second resistor R2, and a third resistor R3. The first resistor R1 and the second resistor R2 are connected in series between an output end of the boost power stage circuit 100 and the ground. The feedback voltage Vp is voltage across the second resistor R2. The third resistor R3 has one end receiving the regulating voltage Vo from the multi-channel constant current driving circuit 110 and another end connected between the first resistor R1 and the second resistor R2. In alternative embodiments, the voltage dividing circuit 130 may be achieved with capacitors or diodes.

FIG. 2 is a circuit diagram of a first embodiment of the LED backlight driving system 10 as disclosed. In one embodiment, the offset voltage generating circuit 140 includes a first switch element Q1, a second switch element Q2, a fourth resistor R4, and a fifth resistor R5. Each of the first switch element Q1 and the second switch element Q2 includes a control port, an input port, and an output port. The control ports receives a first mode selection signal and a second mode selection signal respectively, the input ports are both grounded, and the output ports are connected to one end of the fourth resistor R4 and the fifth resistor R5 respectively. Another end of the fourth resistor R4 and the fifth resistor R5 are connected together and connected between the first resistor R1 and the second resistor R2 of the voltage dividing circuit 130. In one embodiment, the first switch element Q1 and the second switch element Q2 are both N type metal oxide semiconductor field effect transistors (MOSFETs), the control ports are gates, the input ports are sources, and the output ports are drains. The fourth resistor R4 and the fifth resistor R5 have different resistances.

The first switch element Q1 and the second switch element Q2 are turned on/off by respectively inputting the first mode selection signal and the second mode selection signal, to change a resistor parallel with the second resistor R2 of the voltage dividing circuit 130 to change the feedback voltage Vp.

The first and second mode selection signals are logic high and/or low level signals. For example, the logic high level signal may be a voltage signal of about 5V, and the logic low level signal may be a voltage signal of about 0V. If at least one of the first and the second mode selection signals is the logic high level signal, at least one of the first switch element Q1 and the second switch element Q2 is turned on. Thus, at least one of the fourth resistor R4 and the fifth resistor R5 is connected to the second resistor R2 in parallel, so the first resistor R1 bears more voltage, which results in the feedback voltage Vp being reduced. If the first and second mode selection signals are both logic low level signals, the first switch element Q1 and the second switch element Q2 are both turned off, and there is no resistors connected to the second resistor R2 in parallel. Thus, the feedback voltage Vp has higher voltage. Therefore, different mode selection signals are input according to different driving current needed, to modify the feedback voltage Vp. Thus, the set point of the driving voltage Vout changes correspondingly to reduce the regulating scope of the regulating voltage Vo.

In FIG. 2, the LED backlight driving system 10 drives one LED array 20, and the offset voltage generating circuit 140 can be achieved easily with simple circuits at low cost.

FIG. 3 is a circuit diagram of a second embodiment of the LED backlight driving system 10 as disclosed. In this embodiment, the LED backlight driving system 10 drives a plurality of LED arrays, and two exemplary LED arrays 20 and 21 are shown in FIG. 3. The LED array 20 and corresponding boost power stage circuit 100, controller 120, and voltage dividing circuit 30 have similar structures and connections as those of FIG. 2, and the LED array 21 and corresponding boost power stage circuit 101, controller 111, and voltage dividing circuit 131 also have similar structures and connections as those of FIG. 2. Therefore, descriptions are omitted here. In this embodiment, the LED backlight driving system 10 includes an offset voltage generating circuit 140', and the offset voltage generating circuit 140' includes a third switch element Q3, a fourth switch element Q4, a sixth resistor R6, a seventh resistor R7, an eighth resistor R8, a ninth resistor R9, and a voltage follower 1400. The third switch element Q3, the fourth switch element Q4, the sixth resistor R6, and the seventh resistor R7 have similar connections and features as the offset voltage generating circuit 140, therefore descriptions are omitted here. The eighth resistor R8 and the ninth resistor R9 are connected in series between reference voltage Vcc and the ground, and a common end between the eighth resistor R8 and the ninth resistor R9 is connected to another end of the sixth resistor R6 and the seventh resistor R7. A positive input port of the voltage follower 1400 is connected between the eighth resistor R8 and the ninth resistor R9, an output port of the voltage follower 1400 is connected between the first resistor R1 and the second resistor R2 of each of the voltage dividing circuits 130 and 131 to output the offset voltage Voffset. The voltage follower 1400 stabilizes the offset voltage Voffset, which avoids load influence on the offset voltage Voffset.

In this embodiment, the third switch element Q3 and the fourth switch element Q4 are turned on/off by respectively inputting the first mode selection signal the second mode selection signal, to change a resistor to be parallel with the ninth resistor R9 of the voltage dividing circuit 130 to change voltage across the ninth resistor R9. That is, the offset voltage Voffset output by the voltage follower 1400 is modified, which modifies the feedback voltage Vp of the voltage dividing circuit 130. Thus, the set point of the driving voltage Vout changes correspondingly to reduce the regulating scope of the regulating voltage Vo. In this embodiment, the offset voltage generating circuit 140' can stabilize the offset voltage Voffset, which is suitable for the LED backlight driving system 10 having LED arrays 20 and 21.

FIG. 4 is a circuit diagram of a third embodiment of the LED backlight driving system 10 as disclosed. The difference between FIGS. 4 and 2 is that a microprocessor 140" generates the offset voltage Voffset in the third embodiment. The microprocessor 140" receives the first and second mode selection signals, generates corresponding offset voltage Voffset, and superposes the offset voltage Voffset to the second resistor R2 by an eleventh resistor R11. The LED backlight driving system 10 is suitable for designs utilizing single chips.

The LED backlight driving system 10 utilizes the offset voltage generating circuit 140, 140', 140" to generate suitable offset voltage Voffset to change the feedback voltage Vp of the voltage dividing circuits 130 and 131. Thus, the set point of the driving voltage Vout changes correspondingly to reduce the regulating scope of the regulating voltage Vo of the multi-channel constant current driving circuits 110 and 111. Therefore, the multi-channel constant current driving circuits 110 and 111 have higher regulating precision and lower operating temperatures, and regulate the driving voltage Vout to best value to achieve best converting efficiency.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A light emitting diode (LED) backlight driving system, for driving at least one LED array comprising a plurality of LED strings in parallel, the LED backlight driving system comprising:
    at least one boost power stage circuit, operable to boost direct current (DC) power signals to output driving voltage to drive the LED array;
    at least one controller, operable to control the boost power stage circuit;
    at least one multi-channel constant current driving circuit, operable to control current flowing through the LED array and to output regulating voltage to the controller to regulate the driving voltage output by the boost power stage circuit;
    at least one voltage dividing circuit, operable to divide the driving voltage to generate feedback voltage to send to the controller, the at least one voltage dividing circuit comprising:
    a first resistor;
    a second resistor, connected to the first resistor in series between the boost power stage circuit and the ground; and
    a third resistor with one end receiving the regulating voltage from the multi-channel constant current driving circuit and another end connected between the first resistor and the second resistor; and
    an offset voltage generating circuit, operable to generate offset voltage to modify the feedback voltage according to at least one mode selection signal;
    wherein the controller controls the driving voltage according to the modified feedback voltage and the regulating voltage.

2. The LED backlight driving system of claim 1, wherein the feedback voltage is voltage across the second resistor.

3. The LED backlight driving system of claim 2, wherein the offset voltage generating circuit comprises:

a first switch element, comprising a control port, an input port and an output port, wherein the control port receives a first mode selection signal, and the input port is grounded;
a second switch element, comprising a control port, an input port and an output port, wherein the control port receives a second mode selection signal, and the input port is grounded;
a fourth resistor with one end connected to the output port of the first switch element; and
a fifth resistor with one end connected to the output port of the second switch element, and another end connected to another end of the fourth resistor and between the first resistor and the second resistor.

4. The LED backlight driving system of claim 3, wherein the first switch element and the second switch element are N type metal oxide semiconductor field effect transistors (MOSFETs), the control ports are gates, the input ports are sources, and the output ports are drains.

5. The LED backlight driving system of claim 2, wherein the LED backlight driving system drives a plurality of LED arrays, and each LED array corresponds to one boost power stage circuit, one multi-channel constant current driving circuit, one controller, and one voltage dividing circuit.

6. The LED backlight driving system of claim 5, wherein the offset voltage generating circuit comprises:
a third switch element, comprising a control port, an input port and an output port, wherein the control port receives a first mode selection signal, and the input port is grounded;
a fourth switch element, comprising a control port, an input port and an output port, wherein the control port receives a second mode selection signal, and the input port is grounded;
a sixth resistor with one end connected to the output port of the third switch element;
a seventh resistor with one end connected to the output port of the fourth switch element and another end connected to another end of the sixth resistor;
an eighth resistor;
a ninth resistor, connected to the eighth resistor in series and between reference voltage and the ground, a common end between the eighth resistor and the ninth resistor connected to the another ends of the sixth resistor and the seventh resistor; and
a voltage follower, comprising a positive input port connected between the eighth resistor and the ninth resistor, an output port connected between the first resistor and the second resistor of each voltage dividing circuit.

7. The LED backlight driving system of claim 6, wherein the third switch element and the fourth switch element are N type MOSFETs, the control ports are gates, the input ports are sources, and the output ports are drains.

8. The LED backlight driving system of claim 2, wherein the offset voltage generating circuit comprises a microprocessor, operable to receive a first and a second mode selection signals, generate the offset voltage, and superpose the offset voltage to the second resistor.

9. A light emitting diode (LED) backlight driving system, for driving at least one LED array comprising a plurality of LED strings in parallel, the LED backlight driving system comprising:
at least one boost power stage circuit, operable to boost direct current (DC) power signals to output driving voltage to drive the LED array;
at least one controller, operable to control the boost power stage circuit;
at least one multi-channel constant current driving circuit, operable to control current flowing through the LED array and to output regulating voltage to the controller to regulate the driving voltage output by the boost power stage circuit;
at least one voltage dividing circuit, operable to divide the driving voltage to generate feedback voltage to send to the controller; and
an offset voltage generating circuit, operable to generate offset voltage to modify the feedback voltage according to at least one mode selection signal;
wherein the controller controls the driving voltage according to the modified feedback voltage and the regulating voltage to control the current flowing through the LED array operating at different values corresponding to different output brightness of the LED array, and the number of the mode selection signals is related to the number of the values of the current flowing through the LED array.

10. The LED backlight driving system of claim 9, wherein the voltage dividing circuit comprises:
a first resistor;
a second resistor, connected to the first resistor in series between the boost power stage circuit and the ground; and
a third resistor with one end receiving the regulating voltage from the multi-channel constant current driving circuit and another end connected between the first resistor and the second resistor.

11. The LED backlight driving system of claim 10, wherein the feedback voltage is voltage across the second resistor.

12. The LED backlight driving system of claim 11, wherein the offset voltage generating circuit comprises:
a first switch element, comprising a control port, an input port and an output port, wherein the control port receives a first mode selection signal, and the input port is grounded;
a second switch element, comprising a control port, an input port and an output port, wherein the control port receives a second mode selection signal, and the input port is grounded;
a fourth resistor with one end connected to the output port of the first switch element; and
a fifth resistor with one end connected to the output port of the second switch element, and another end connected to another end of the fourth resistor and between the first resistor and the second resistor.

13. The LED backlight driving system of claim 12, wherein the first switch element and the second switch element are N type metal oxide semiconductor field effect transistors (MOSFETs), the control ports are gates, the input ports are sources, and the output ports are drains.

14. The LED backlight driving system of claim 11, wherein the LED backlight driving system drives a plurality of LED arrays, and each LED array corresponds to one boost power stage circuit, one multi-channel constant current driving circuit, one controller, and one voltage dividing circuit.

15. The LED backlight driving system of claim 14, wherein the offset voltage generating circuit comprises:
a third switch element, comprising a control port, an input port and an output port, wherein the control port receives a first mode selection signal, and the input port is grounded;
a fourth switch element, comprising a control port, an input port and an output port, wherein the control port receives a second mode selection signal, and the input port is grounded;

a sixth resistor with one end connected to the output port of the third switch element;
a seventh resistor with one end connected to the output port of the fourth switch element and another end connected to another end of the sixth resistor;
an eighth resistor;
a ninth resistor, connected to the eighth resistor in series and between reference voltage and the ground, a common end between the eighth resistor and the ninth resistor connected to the another ends of the sixth resistor and the seventh resistor; and
a voltage follower, comprising a positive input port connected between the eighth resistor and the ninth resistor, an output port connected between the first resistor and the second resistor of each voltage dividing circuit.

16. The LED backlight driving system of claim 15, wherein the third switch element and the fourth switch element are N type MOSFETs, the control ports are gates, the input ports are sources, and the output ports are drains.

17. The LED backlight driving system of claim 11, wherein the offset voltage generating circuit comprises a microprocessor, operable to receive a first and a second mode selection signals, generate the offset voltage, and superpose the offset voltage to the second resistor.

18. The LED backlight driving system of claim 9, if the number of the mode selection signal is N and the number of the values of the current flowing through the LED array is M, where $M=2^N$.

* * * * *